R. SCHANZ.
DEVICE FOR FACILITATING BASKET MAKING.
APPLICATION FILED SEPT. 25, 1911.

1,024,602.

Patented Apr. 30, 1912.
2 SHEETS—SHEET 1.

Witnesses.

Inventor:
Richard Schanz

R. SCHANZ.
DEVICE FOR FACILITATING BASKET MAKING.
APPLICATION FILED SEPT. 25, 1911.
1,024,602.
Patented Apr. 30, 1912.
2 SHEETS—SHEET 2.
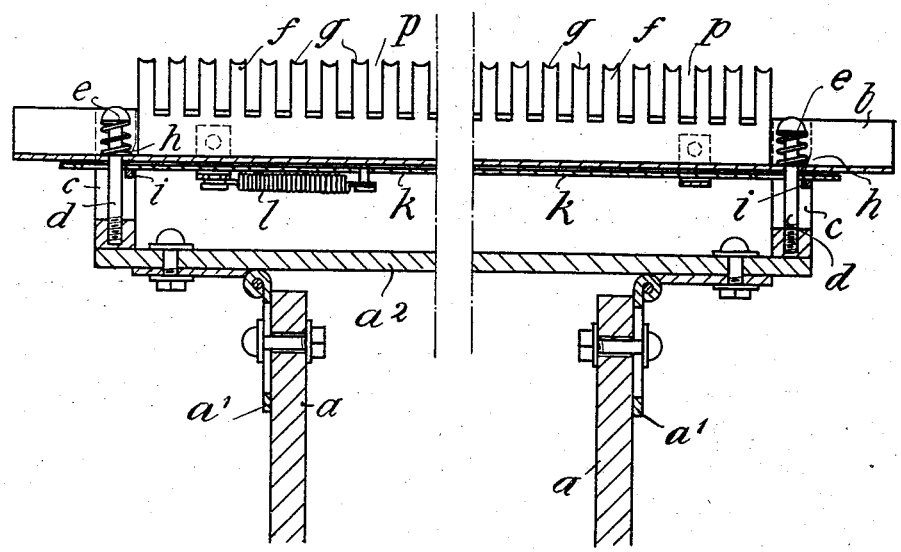
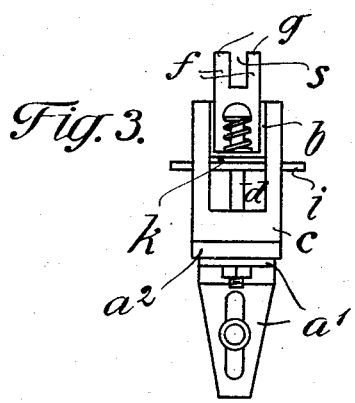
Witnesses.
Inventor.
Richard Schanz.

UNITED STATES PATENT OFFICE.

RICHARD SCHANZ, OF HEIDENAU, GERMANY.

DEVICE FOR FACILITATING BASKET-MAKING.

1,024,602.  Specification of Letters Patent.  Patented Apr. 30, 1912.

Application filed September 25, 1911. Serial No. 651,171.

*To all whom it may concern:*

Be it known that I, RICHARD SCHANZ, a subject of the Emperor of Germany, residing at Heidenau, District of Dresden, Germany, have invented a certain Improved Device for Facilitating Basket-Making, of which the following is a specification.

The present invention relates to a device such as used for facilitating basket-making and consists in the provision of a drum formed of two disks connected by cross-bars carrying double-rows of teeth, the wicker-work being formed by winding the canes or the like on and between the teeth, means being provided for bending the canes between the teeth to allow an insertion of the stakes.

Figure 1:
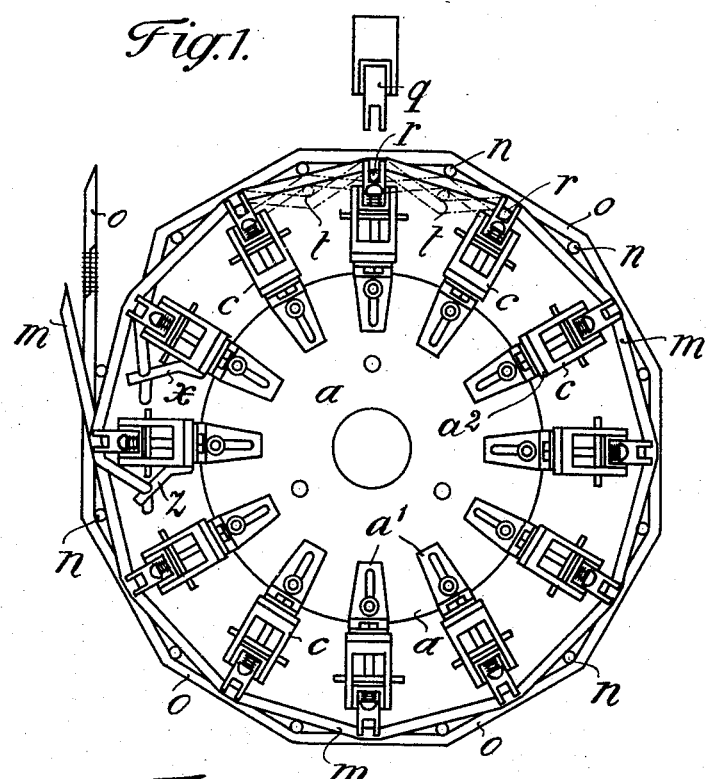
Figure 4:
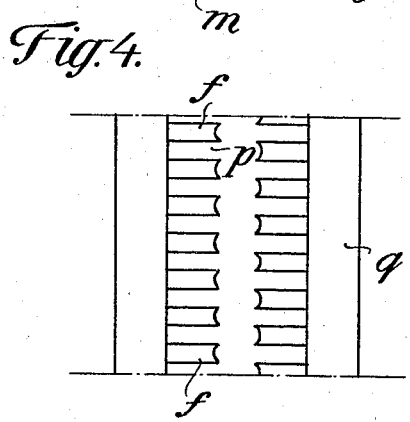

In the accompanying drawings the invention is illustrated by way of example, Figure 1 representing an end view of the device, Fig. 2, a sectional view of part of the same, Fig. 3, an end view of a row of teeth on an enlarged scale, and Fig. 4, a side view of the teeth together with the elements for bending the canes.

The device consists of two disks $a$ which are mounted on a rotatable shaft. On each disk a plurality of radially arranged, adjustable holders $a^1$ are provided for the reception of cross-bars $a^2$ which, together with the disk $a$, form a kind of drum. On the outer ends of the bar $a^2$ radiating forked brackets $c$ are arranged in which channeled bars $b$ are slidably guided. Pins $d$, mounted between the fork members of the brackets, pass through apertures in the bars $b$ and carry spiral springs $e$ which abut against said bars and against the heads of the pins, the tendency of the springs being to press the bars against the bottom of the brackets. The bars are retained in the outer ends of the brackets by cross-pins $i$ which for that purpose engage notches $h$ in the brackets. The cross-pins are carried by slides $k$ which are guided on the underside of the bars $b$ and actuated by coil-springs $l$ tending to hold the pins $i$ in engagement with the notches $h$, the spring being connected with its opposite ends to brackets on the slide and on the bar $b$.

In the channeled bar $b$ an element is arranged which carries two rows of teeth $f$, spaces $s$ being formed between the rows and spaces $p$ between the individual teeth. The outer end of each tooth is formed with a depression $g$ carried transversely of the bar $b$. Longitudinally of the bar $b$ a bar $q$ is arranged away from the drum which latter bar carries teeth corresponding to the teeth $f$ but arranged so that, when the bar $q$ is approached to one of the bars $b$, the teeth of the former enter the spaces $p$ and mesh with the teeth $f$. Brackets $x$ and $z$ are provided on some of the brackets $c$ to hold the ends of the canes.

The *modus operandi* is as follows:—The canes or the like of which the wicker-work is made are wound on the drum formed as previously described. One cane $m$ is first wound from the bracket $z$ over all the teeth $f$, as shown in Fig. 1. Thereupon the stakes $n$ are placed on the canes midway between the bars $b$ and secured in position by suitable means. Another cane $o$ is then wound from the bracket $x$ over the stakes $n$, this cane being placed between the turns of the cane $m$ and carried through the spaces $p$ between the teeth $f$. The winding having been completed, one set of teeth $f$ is turned into register with the teeth of the bar $q$ which is then depressed, the windings of the cane $o$ being engaged by its teeth and forced to the bottom of the spaces $p$. The canes will then take up the position shown by broken lines in Fig. 1, and the meshing double rows of teeth will leave room between them for a stake $r$ to be inserted through the space $s$ so as to complete the wicker-work. This operation is repeated for each double row of teeth $f$, the drum being turned to bring them into register with the bar $q$. The materials are contracted by the bending of the canes so that a very firm wicker-work is obtained. After the completion of the wicker-work, the slides $k$ are actuated so as to release the cross-pins $i$ from the notches in the brackets $c$ and allow the bars $b$ to recede into the brackets under the pressure of the wicker-work and of the springs $e$. Having thus been released from the teeth $f$, the wicker-work can be removed from the apparatus and finished in the usual manner.

It is evident that by adjusting the holders $a^1$ on the disks $a$ the basket may be made either cylindrical or conical.

I claim:

1. A device for facilitating basket-making, comprising a rotatable shaft, two disks mounted thereon, a plurality of adjustable cross-bars arranged on said disks to form a drum, forked brackets for holding said cross-bars on the disks, springs tending to hold the cross-bars against the bottom of the brackets, spring-actuated slides on the cross-bars having cross-pins adapted to engage notches in the brackets so as to hold the cross-bars in the outer ends of the brackets, the cross-bars carrying double-rows of teeth allowing the canes to be wound on and between them, and a loose bar having teeth adapted to mesh with the former teeth for depressing the canes between them so as to allow the stakes to be inserted in position, substantially as set forth.

2. A device for facilitating basket-making, comprising a rotatable shaft, two disks mounted thereon, a plurality of cross-bars arranged on said disks to form a drum, means for adjusting the distance between said cross-bars and the shaft, means for setting the cross-bars at different angles relative to the shaft, double-rows of teeth connected to said cross-bars so as to allow the canes to be wound on and between them, and a loose bar having teeth adapted to mesh with the former teeth for depressing the canes between them so as to allow the stakes to be inserted in position, substantially as set forth.

RICHARD SCHANZ.

Witnesses:
 CHAS. T. TERRY,
 I. I. HELSDON RIX.